United States Patent
Chang et al.

(10) Patent No.: US 9,479,473 B2
(45) Date of Patent: Oct. 25, 2016

(54) SOCIAL NETWORK SYSTEM WITH TRACKED UNREAD MESSAGES

(71) Applicant: ORACLE INTERNATIONAL CORPORATION, Redwood Shores, CA (US)

(72) Inventors: Ana Ramirez Chang, Boulder, CO (US); Terry M. Olkin, Niwot, CO (US); Jeffrey Olkin, Princeton, NJ (US); Daniel G. Rabe, Lafayette, CO (US); Lenny Karpel, Lyons, CO (US); Jeremy Michael Crosbie, Broomfield, CO (US); Robert D. Whiton, Louisville, CO (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 618 days.

(21) Appl. No.: 13/873,756

(22) Filed: Apr. 30, 2013

(65) Prior Publication Data
US 2014/0324984 A1    Oct. 30, 2014

(51) Int. Cl.
G06F 15/16    (2006.01)
H04L 12/58    (2006.01)

(52) U.S. Cl.
CPC .................... *H04L 51/32* (2013.01)

(58) Field of Classification Search
CPC ...... H04L 51/32; H04L 51/34; G06Q 10/107
USPC ........................................ 709/206, 217, 219
See application file for complete search history.

(56) References Cited

U.S. PATENT DOCUMENTS

| | | |
|---|---|---|
| 7,447,647 B1 | 11/2008 | Shedlack |
| 7,739,139 B2 | 6/2010 | Robertson et al. |
| 8,171,087 B2 | 5/2012 | Carrer et al. |
| 8,819,150 B1 | 8/2014 | Osinga et al. |
| 9,253,137 B1 | 2/2016 | Jackson et al. |
| 2004/0122803 A1 | 6/2004 | Dom et al. |
| 2005/0223058 A1 | 10/2005 | Buchheit et al. |
| 2006/0064434 A1 | 3/2006 | Gilbert et al. |
| 2007/0203991 A1* | 8/2007 | Fisher ............... G06Q 10/107 709/206 |
| 2008/0103907 A1 | 5/2008 | Maislos et al. |
| 2008/0109741 A1 | 5/2008 | Messing et al. |

(Continued)

FOREIGN PATENT DOCUMENTS

| | | |
|---|---|---|
| WO | 2009120775 A1 | 10/2009 |
| WO | 2011163147 A3 | 3/2012 |

OTHER PUBLICATIONS

IBM—IBM Connections_Social software for business—IBM Connections-Software; "IBM Connections Driving business results"; http://www-01.ibm.com/software/lotus/products/connections; last downloaded May 30, 2012.

(Continued)

*Primary Examiner* — Frantz Jean
(74) *Attorney, Agent, or Firm* — Miles & Stockbridge P.C.

(57) ABSTRACT

A social network system that tracks unread messages across a social network for a social network user receives a request from the user to display unread messages across the social network and generates and displays a list of one or more conversations, where the user is a member of the displayed conversations. The system then, for each conversation, determines and displays the number of unread messages.

21 Claims, 14 Drawing Sheets

(56) References Cited

U.S. PATENT DOCUMENTS

| | | | |
|---|---|---|---|
| 2008/0147487 | A1 | 6/2008 | Hirshberg |
| 2009/0222448 | A1 | 9/2009 | Caldwell et al. |
| 2009/0222750 | A1 | 9/2009 | Jain et al. |
| 2009/0305732 | A1 | 12/2009 | Marcellino et al. |
| 2009/0307592 | A1 | 12/2009 | Kalanithi et al. |
| 2010/0070485 | A1 | 3/2010 | Parsons et al. |
| 2010/0169134 | A1 | 7/2010 | Cheng et al. |
| 2010/0169159 | A1 | 7/2010 | Rose et al. |
| 2010/0169327 | A1 | 7/2010 | Lindsay et al. |
| 2010/0174747 | A1 | 7/2010 | Farrell et al. |
| 2010/0198757 | A1 | 8/2010 | Cheng et al. |
| 2010/0211917 | A1 | 8/2010 | Tsuei |
| 2010/0318613 | A1 | 12/2010 | Souza et al. |
| 2010/0325107 | A1 | 12/2010 | Kenton et al. |
| 2011/0035677 | A1 | 2/2011 | Vitale et al. |
| 2011/0137902 | A1 | 6/2011 | Wable et al. |
| 2011/0161827 | A1 | 6/2011 | Dedis et al. |
| 2011/0179025 | A1 | 7/2011 | Chuang |
| 2011/0246920 | A1 | 10/2011 | Lebrun |
| 2011/0314017 | A1 | 12/2011 | Yariv et al. |
| 2012/0001919 | A1 | 1/2012 | Lumer |
| 2012/0011039 | A1 | 1/2012 | Cina et al. |
| 2012/0124483 | A1* | 5/2012 | Zuckerberg ............. H04L 51/36 715/752 |
| 2012/0143972 | A1 | 6/2012 | Malik et al. |
| 2012/0158501 | A1 | 6/2012 | Zhang et al. |
| 2012/0197809 | A1 | 8/2012 | Earl et al. |
| 2012/0290448 | A1 | 11/2012 | England et al. |
| 2012/0290950 | A1 | 11/2012 | Rapaport et al. |
| 2012/0331053 | A1 | 12/2012 | Dunn |
| 2013/0024511 | A1 | 1/2013 | Dunn et al. |
| 2013/0024788 | A1 | 1/2013 | Olsen et al. |
| 2013/0091217 | A1 | 4/2013 | Schneider |
| 2013/0173368 | A1 | 7/2013 | Boutin et al. |
| 2013/0185143 | A1 | 7/2013 | Damman et al. |
| 2013/0191506 | A1* | 7/2013 | Polis ....................... H04L 67/00 709/217 |
| 2013/0198275 | A1 | 8/2013 | Forsblom |
| 2013/0262595 | A1 | 10/2013 | Srikrishna et al. |
| 2013/0325733 | A1* | 12/2013 | Wu ........................ G06Q 10/06 705/319 |
| 2014/0012927 | A1 | 1/2014 | Gertzfield et al. |
| 2014/0189524 | A1 | 7/2014 | Murarka et al. |
| 2014/0189539 | A1 | 7/2014 | St. Clair et al. |

OTHER PUBLICATIONS

IBM Connections—Social Analytics; "IBM Connections Social Analytics"; http://www-01.ibm.com/software/lotus;products/connections/analytics.html; last downloaded May 30, 2012.
"TDash-Online Twitter Client That Maakes Managing Unread Tweets Easy"; http://www.makeuseof.com/tag/webbeased-twitter-client-tdash-lets-manage-unread-tweets-ease/; last accessed on May 23, 2012.
www.yammer.com; "Introducing: Group Counters & Network Notifications" 2011.
http://learn.linkedin.com/inbox; last accessed on May 23, 2012.
Quickstart Guide: What Matters-Communications\Jive Community; https://community.jivesofware.com/docs/DOC-43665; Aug. 1, 2011.
How do I mark a message as read or unread?—Facebook Help Center/Facebook; http://www.facebook.com/help/?faq=213183835379234; last accessed on May 23, 2012.
Site Update: Unread Message Counts, Sta.sh Updates by $danlev and deviantArt; http://http://danlev.deviantart.com/journal/Site-Update-Unread-Message-Counts-Sta-sh-Updates-289171986?moodonly=1; last accessed on May 23, 2012.
"About the Discussion Board"; http:help.blackboard.com/instructor/content/_instructor_course/instructor_course_tool; last accessed on May 23, 2012.
"Socialcast"; http://socialcast.com/team-collaboration; last accessed on May 23, 2012.
"Plugins" http://buddypress.org/extend/plugins/?search=BP+unread+post; last accessed on May 23, 2012.
"Unread Posts <<bbPress Plugin Browser"; http://bbpress.org/plugins/topic/unread-posts/; last accessed on May 23, 2012.
"PinguyOS"; http:/forum.pinguyos.com/index.php; last accessed on May 23, 2012.
"Google Reader Sort on Unread Items"; http:/userscripts.org/scripts/show/12287; last accessed on May 23, 2012.
"Data Sheet for Salesforce Chatter", http://www.salesforce.com/events/docs/DS_Chatter_2010-04-02.pdf; last downloaded Sep. 18, 2012.
"Salesforce Chatter" http://www.salesforce.com/crm/sales-force-automation/sales-tracking/; last downloaded Jun. 5, 2012.
"IdeaPlaneKinetic Product"; http://ideaplane.com/products/features; copyright 2010-2012—IdeaPlane, last downloaded Jun. 5, 2012.
"Mark as Read for WordPress"; http://codecanyon.net/item/mark-as-read-for-wordpress/696983; last downloaded Jun. 5, 2012.
"Mapping Search Relevance to Social Networks"; http://www.socialnetworkanalysis.info/snakdd2009/AcceptedPapers/snakdd2009_submission_7.pdf; the 3rd SNA-KDD Workshop '09 (SNA-KDD'09), Jun. 28, 2009; Paris, France; Copyright 2009; ACM978-I-59593-848-0.
"IBM Connections"; http://www-01.ibm.com/software/lotus/products/connections/features.html?S_CMP=mav; last downloaded Jun. 5, 2012.
Oracle Data Sheet; "Oracle on Track Communication"; 2011.
"F The Oracle Text Scoring Algorithm"; Oracle Text Reference; 11g Release 2 (11.2); http://docs.oracle.com/cd/E14072_01/text.112/e10944/ascore.htm; last downloaded Dec. 18, 2012.
Oracle, "Oracle on Track Communication White Paper"; Jun. 2011.
SB. Hecht et al.; "SearchBuddies: Bringing Search Engines into the Conversation"; Association for the Advancement of Artificial Intelligence; 2012.
"Enterprise Search Relevance Architecture Overview, Office 2007", msdn; http://msdn.microsoft.com/en-us/library/ms549085%28v=office.12%29.aspx; last downloaded Jun. 1, 2012.
Groofer get group smart; "What is groofer"; http://www.groofer.com/what-is-groofer; last downloaded Jun. 1, 2012.
A. Wable; "Intro to Facebook Search"; Mar. 16, 2010; http://www.facebook.com/note.php?note_id=365915113919.
"Bing Search Quality Insights: Whole Page Relevance"; http://www.bing.com/community/site_blogs/b/search/archive/2012/03/05/bing-search-quality-insights-whole-page-relevance.aspx; last downloaded Jun. 1, 2012.
Twitter Help Center; "About Top Seach Results"; https://support.twitter.com/articles/131209-what-are-top-tweets; last downloaded Jun. 1, 2012.
"Improving Relevance Office 2007"; msdn; http://msdn.mircorsoft.com/en-us/library/ms584432(d=printer,v=office.12); last downloaded Jun. 1, 2012.
Microsoft Online Services; "Enhancing Collaboration and Increasing Innovation with Social Computing"; http://www.google.com/#hl=en&tbo=d&spell=1&q=microsoft+online+services,+ newsgator,+ enhancing+collaboration+and+increasing+innovation+with+socialcomputing&sa=X&ei=pnbPUKPIBsrBqAGLxlB4
&ved=0CC4QvwUoAA&bav=on.2,or.r_gc.r_pw.r_qf.&bvm=bv.1355325884,d.b2l&fp=df780ed0043388ab&bpcl=39967673
&biw=1440&bih=815; downloaded May 30, 2012.
R. Schirru; "Topic-Based Recommendations in Enterprise Social Media Sharing Platforms"; SecSys2010; Sep. 26-30, 2012; Barcelona, Spain; ACM 978-1-60558-906-0/10/09; pp. 369-372.

* cited by examiner

SOCIAL NETWORK SYSTEM WITH TRACKED UNREAD MESSAGES

FIELD

One embodiment is directed generally to a networked computer system, and in particular to a social network system that tracks unread messages.

BACKGROUND INFORMATION

A social network service or system, or "social network", is an online service, platform, or site that focuses on facilitating the building of social networks or social relations among people who, for example, share interests, activities, backgrounds, or real-life connections. A social network service typically includes a representation of each user, typically referred to as a user "profile", his/her social links, and a variety of additional services. Most social network services are web-based and provide means for users to interact over the Internet, such as e-mail and instant messaging. Social networking sites allow users to share ideas, activities, events, and interests within their individual networks.

The use of social network services in an enterprise/business context is increasingly popular. Because social networks connect people at low cost, they can be beneficial for entrepreneurs and small businesses looking to expand their contact bases. These networks often act as a customer relationship management tool for companies selling products and services. Companies can also use social networks for targeted advertising in the form of banners and text ads. Since businesses operate globally, social networks can make it easier to keep in touch with contacts around the world.

SUMMARY

One embodiment is a social network system that tracks unread messages across a social network for a social network user. The system receives a request from the user to display unread messages across the social network and generates and displays a list of one or more conversations, where the user is a member of the displayed conversations. The system then, for each conversation, determines and displays the number of unread messages.

BRIEF DESCRIPTION OF THE DRAWINGS

FIG. 3 is a screenshot showing an example social object in accordance with one embodiment of the present invention.

FIG. 5 is a screenshot showing another example social object in accordance with one embodiment of the present invention.

FIG. 8 is a screenshot showing the example business object of FIG. 7 after the New Related Conversation button has been selected in accordance with an embodiment of the present invention.

DETAILED DESCRIPTION

One embodiment is a social network system that creates social objects that correspond to business objects from enterprise business applications. The system further generates conversations formed of messages and other types of posts. Conversations can be related to a social object, a user's "wall" or unrelated. For a particular user, the system determines and displays the number of read/unread messages for each conversation that the user is a member of across the entire social network.

Figure 1:
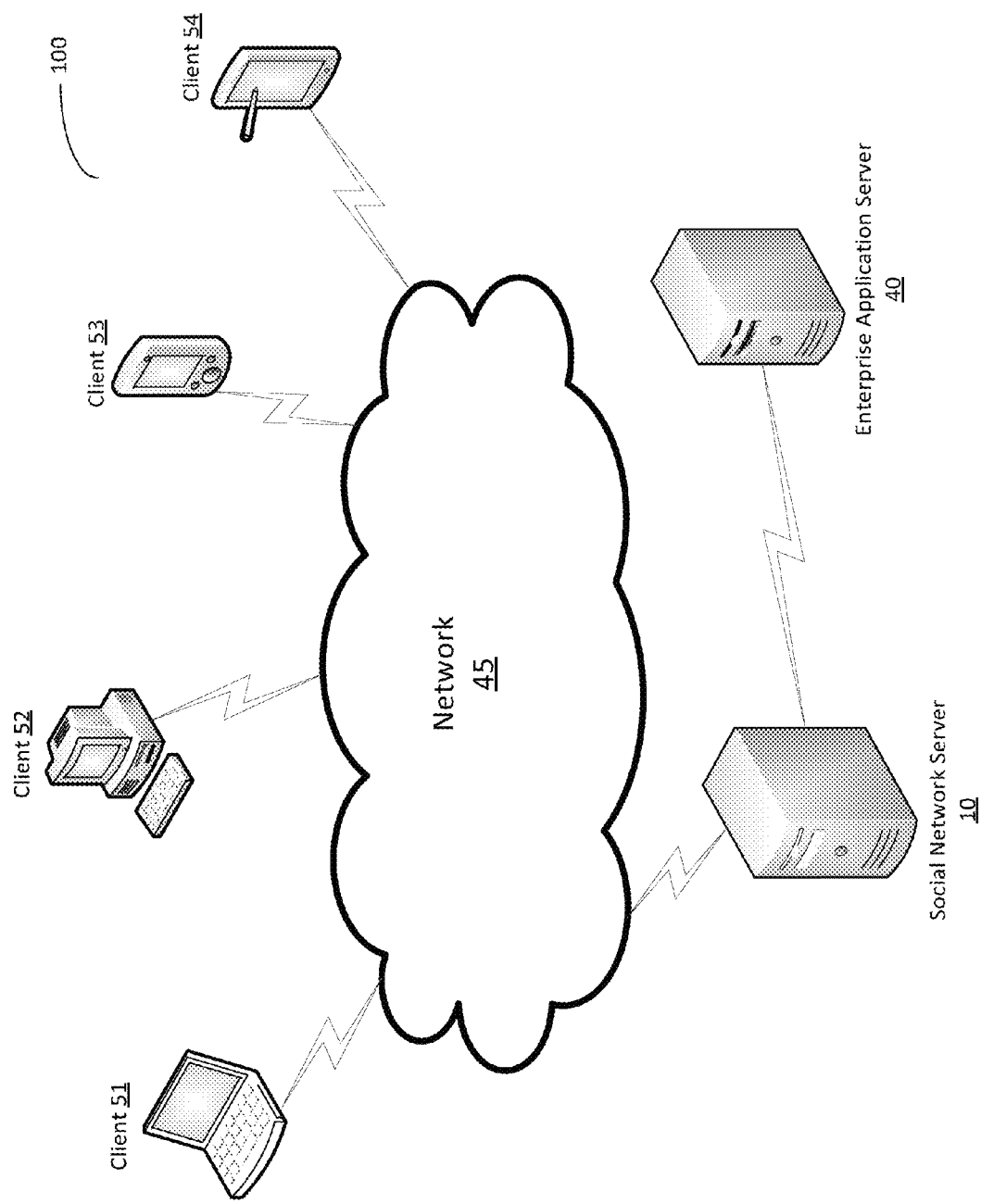
FIG. 1 is an overview block diagram of an example of a social network in accordance with embodiments of the present invention.

FIG. 1 is an overview block diagram of an example of a social network 100 in accordance with embodiments of the present invention. Social network 100 includes a social network server/system 10 coupled to client devices 51-54 through a network 45. Network 45 can be any type of communication network, such as the Internet or an Intranet or other private network. Client devices 51-54 can be any type of device that allows a user to interface with server 10, including a laptop computer 51, a desktop computer 52, a smart phone 53, a tablet 54, etc., using a wired or wireless connection, or any other method. Further, in other embodiments, a user can interface directly with server 10 (i.e., not via a network) through a directly coupled client device (not shown). Client devices 51-54 execute a web browser or other functionality that provides an interface with server 10.

Social network server/system 10, in conjunction with the other devices of FIG. 1, substantially provides the functionality of a social network, as disclosed in more detail below. Social network server 10 is coupled to an enterprise application server 40. Enterprise application server 40 in one embodiment is a server or servers that execute enterprise applications, such as human resource ("HR") applications, customer relationship management ("CRM") applications, enterprise resource planning ("ERP") applications, etc. In one embodiment, the enterprise applications on server 40 are the "E-Business Suite" or "Fusion" applications from Oracle Corp. Server 10 can be directly coupled to server 40, or can be coupled in any other way such as over a network. In addition, the functionality of server 40 can be included on server 10. Further, server 40 can be coupled to clients 51-54 directly through a network or other means rather than through server 10. Server 40 is generally not part of social network 100, but provides the business objects and system-of-records that are used to generate social objects.

Figure 2:
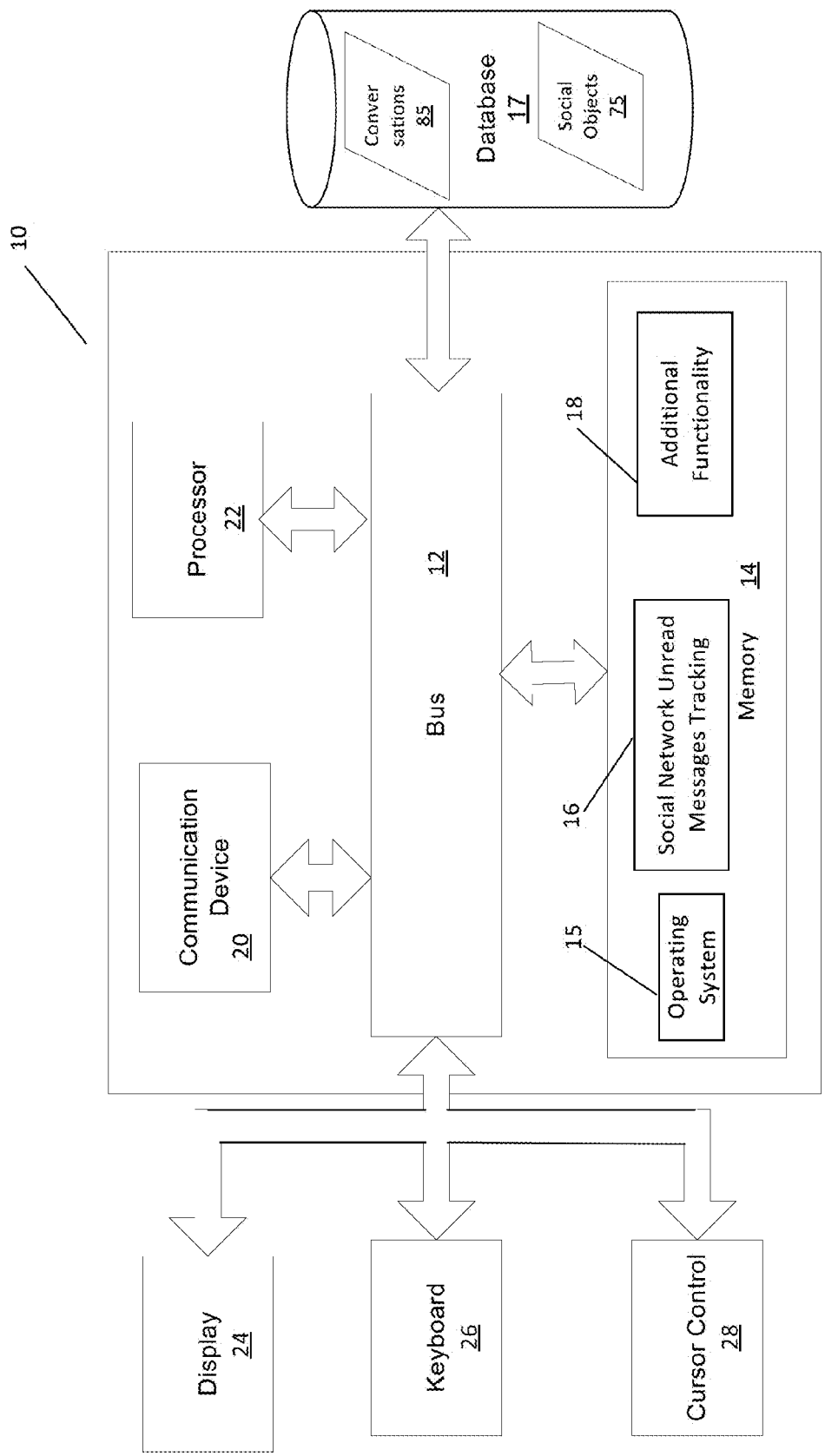
FIG. 2 is a block diagram of the social network server/system of FIG. 1 in accordance with an embodiment of the present invention.

FIG. 2 is a block diagram of social network server/system 10 of FIG. 1 in accordance with an embodiment of the present invention. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a social network module 16 for creating a social object, relating a conversation to a social object, and providing tracking and sorting of unread messages across the social network, as disclosed in more detail below. System 10 can be part of a larger system, such as an ERP system, if that functionality is not already provided by server 40 of FIG. 1. Therefore, system 10 can include one or more additional functional modules 18 to include the additional functionality. A database 17 is coupled to bus 12 to provide centralized storage for modules 16 and 18 and store data such as user profiles, social objects 75, conversations 85, etc. Storage of these items can also be done remote from system 10.

In one embodiment, social network 100 of FIG. 1 is a secure enterprise collaboration and social network software application and platform designed to facilitate social interactions within the enterprise environment (as opposed to a consumer environment) connecting people, applications and business processes within and across businesses. Social network 100 includes user profiles, conversations 85 and social objects 75.

A "conversation" in social network 100 in one embodiment is a persistent, shared stream of posts and comments (i.e., messages) including, for example, text, rich-text, documents, audio, video, programmatic content (referred to as "gadgets"), etc. A conversation has a defined membership ranging from "Private" (i.e., membership of one/self), through N-members consisting of individuals and or groups of individuals or sub-groups, to "Public" with visibility open across all members of social network 100. Posts within a conversation are viewed with new posts beneath old posts (i.e., multiple posts can be read as text on a page in a book), or vice versa, or in any type of hierarchical format.

One embodiment generates social objects. All data from enterprise applications and business processes can potentially be socialized as a "social object." Social objects contain records from a business application or process (referred to as a "system of record") that are mapped as a visual and programmatic integration into social network 100 via social network server 10. For example, a sales opportunity from within a CRM enterprise application (e.g., the name of a sales prospect and related data for the sales prospect, such as the estimated probability that a sale will close, the expected revenue of the sale, etc.) is integrated into social network 100 as a social object. As a result, social objects are explicitly coupled with conversations, where the social object can be discussed in context, and a record of that discussion can be retained for future viewing.

In one embodiment, a social object in social network 100 includes the following:

- A set of programmatic rules defining the behavior of the integration and actions on receiving business events from the object within the system-of-record (i.e., the business object in the enterprise application).
- A "wall" (i.e., a stream of posts) displaying publication of changes in the data set of the associated object from within the system-of-record and status posts from members/users of social network 100 with appropriate access rights. The wall provides an activity stream holding short, sometimes unrelated posts in which old information may scroll off the bottom of the list. The wall differs from a conversation in which all content is related.
- A set of related conversations or other social objects (e.g., a "Customer" social object can be related to multiple "Opportunity" social objects).
- A membership potentially defined, controlled and managed by the system-of-record or open to sharing across the network with individuals and groups.
- A "gadget" storing data from the associated object within a system-of-record allowing quick access and updates to the original data set within the system-of-record (e.g., the revenue value of a CRM opportunity is displayed within a gadget and a member with access to the corresponding opportunity social object and the appropriate access rights within the system of record can update the revenue value in the system-of-record from the gadget tied to the social object within social network 100).

A social object may be generated for social network 100 for any business object of an application that users may desire to collaborate on over social network 100. Examples of social objects include (1) an "Opportunity" social object from a CRM application; (2) a "Customer" social object from a CRM application; (3) a "Service Request" social object from a CRM application; (4) a "Business Process Shipment Escalation" social object from a business process application; (5) a "Portal" subject social object from a web portal application; (6) a "General Ledger Period Close" social object from a financial/ERP application; (7) an "Inventory Item" social object from an inventory/ERP application; and (8) an "Ordered Product" social object from a distributed order orchestration application (e.g., "Fusion Distributed Order Orchestration (DOO)" application from Oracle Corp.).

In one embodiment, a conversation for social network 100 can be created for any collaborative purpose, including having a specific discussion, making a decision or resolving a problem. A conversation can be related to a social object. The conversation can have membership which is identical, a superset or a subset of the social object membership. For example, a conversation can be created that is related to a sales opportunity social object in which the sales team works on preparing the presentation for the customer. A second related conversation can be created in which only the sales lead works with the legal team in reviewing contractual changes requested by the customer. Through related conversations, multiple, parallel threads of work between different constituent parties all related to the changing of state of an object within the system-of-record (e.g., the opportunity changes from a state of "Negotiation" to a state of "Won") is achieved while maintaining the relationship, understanding and contextual persistent of the collaboration that drove the changes. For example, related conversations for an Opportunity social object may include a conversation for preparing a presentation, with the suggested presentation content and best practice notes for delivery, and a conversation for finalizing the contract with the appropriate draft contract for the deal size, industry, product and sales region with the associated legal team member added. A social object can also be related to another social object.

Figure 3:
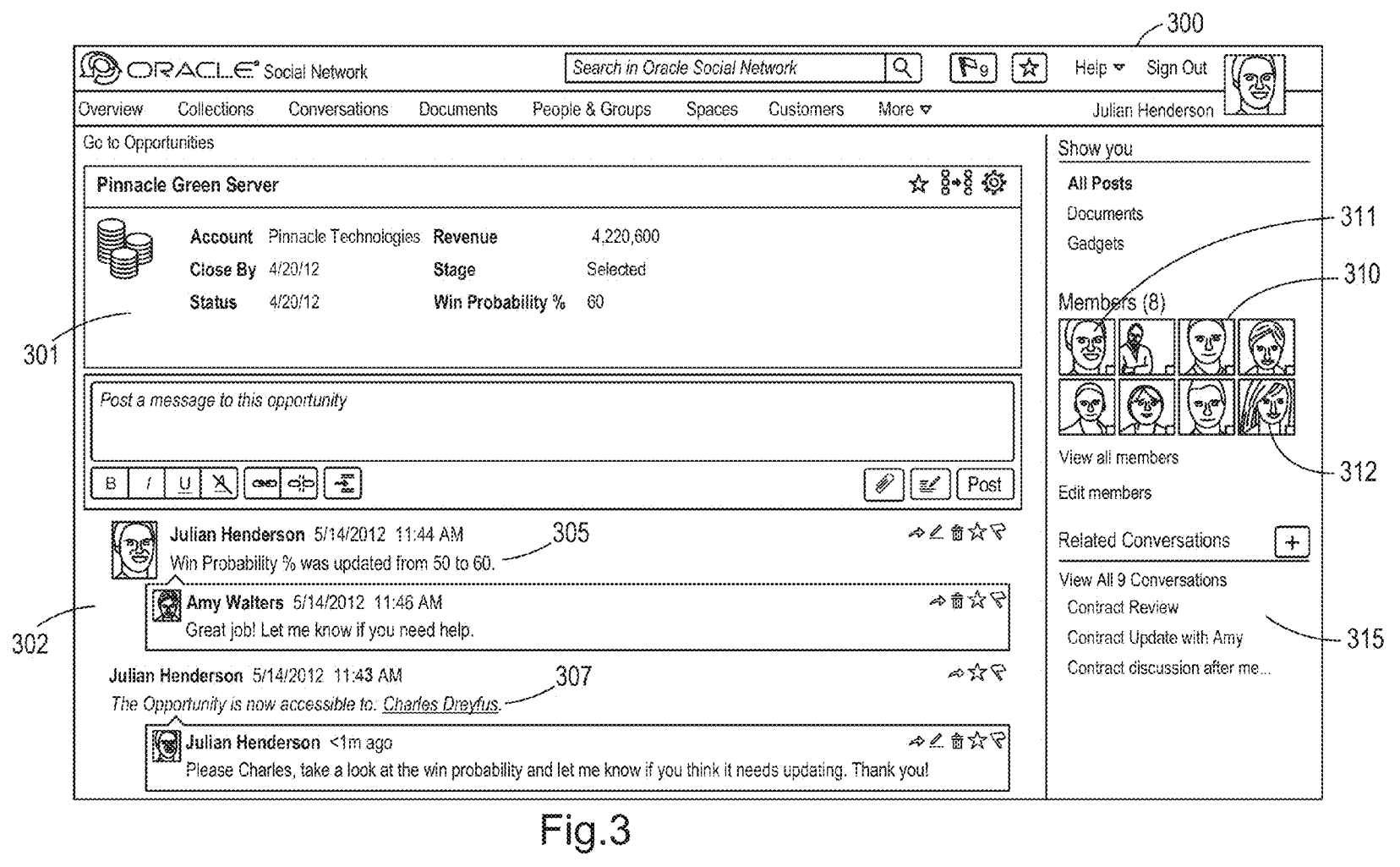

FIG. 3 is a screenshot showing an example social object 300 in accordance with one embodiment of the present invention. Social object 300 shown in FIG. 3 is an Opportunity social object for a "Pinnacle Green Server" product. As shown at 301, information or properties for social object 300 includes the account name ("Pinnacle Technologies"), the expected date of close of the opportunity (Apr. 20, 2012), the expected revenue from the opportunity ($4,220,600), and the probability of success or "win" (60%). The information at 301 is comprised of the properties from the system-of-record of a CRM system that may be external to social network system 100, such as from server 40 of FIG. 1. The properties of 301 are automatically updated as they are updated/changed in the CRM enterprise system. Further, in one embodiment, the properties can be edited in social object 300, and the edits/changes automatically update the properties in the system-of-record of the enterprise system. Therefore, the updating of data/properties can flow in both directions: from the enterprise application to the social network, and vice versa.

Social object 300 further includes a wall 302 that shows a history of all of the changes that have occurred on the social object. For example, at 305, the win probability is shown to have been updated by "Julian Henderson" from 50% to 60% on May 14, 2012 at 11:44 a.m. At 307, a new member, "Charles Dreyfus" was given access to the social object on May 14, 2012 at 11:43 a.m.

Social object 300 further includes a list of all members of the social object at 310. The members who are currently online for that social object (e.g., member 311) are shown with a typical thumbnail picture, but members who are currently offline (e.g., member 312) are shown as a grayed out thumbnail picture.

Social object 300 further includes a list of all conversations related to social object 300 at 315. A user can view one of the conversations by selecting the conversation. In one embodiment, social object 300 and new related conversations such as related conversations 315 are created when the user is interacting with the external or third party enterprise system such as a CRM or ERP system executing on, for example, server 40 of FIG. 1. For a given business object within a system-of-record of an enterprise application, a social object and a customized set of related conversations with content can be created programmatically (e.g., as a pre-defined template) to assist with the collaboration required to change the state of the system-of-record. In one embodiment, an application programming interface ("API") from the enterprise application to the social network application allows changes in the system-of-record to be communicated to the social network system, and vice versa. A selectable list of other social objects that are related to social object 300 can also be displayed.

Figure 4:
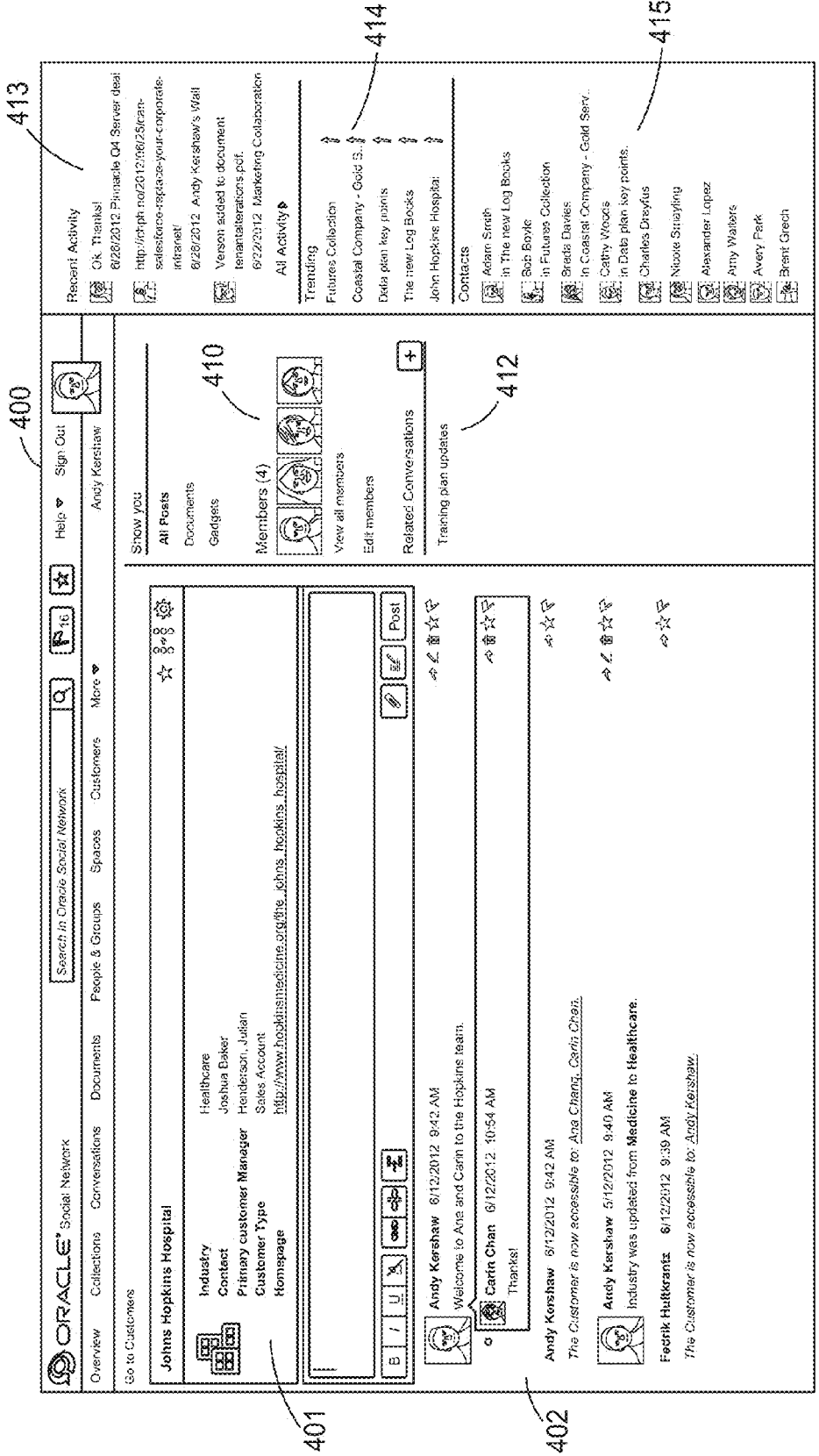
FIG. 4 is a screenshot showing another example social object in accordance with one embodiment of the present invention.

FIG. 4 is a screenshot showing another example social object 400 in accordance with one embodiment of the present invention. Social object 400 shown in FIG. 4 is a Customer social object for a customer named "Johns Hopkins Hospital". The customer in one embodiment is generated from a business object and updated from a system-of-record of a CRM system. The information properties for social object 400 are shown at 401, and the wall is shown at 402. Social object 400 further includes a display of members at 410 and a list of related conversations at 412. Social object 400 further includes a listing of recent activity at 413, trending activity at 414, and selectable contact information for each member at 415 (which may be the members of social object 400, or a list of contacts specific to each user).

Figure 5:
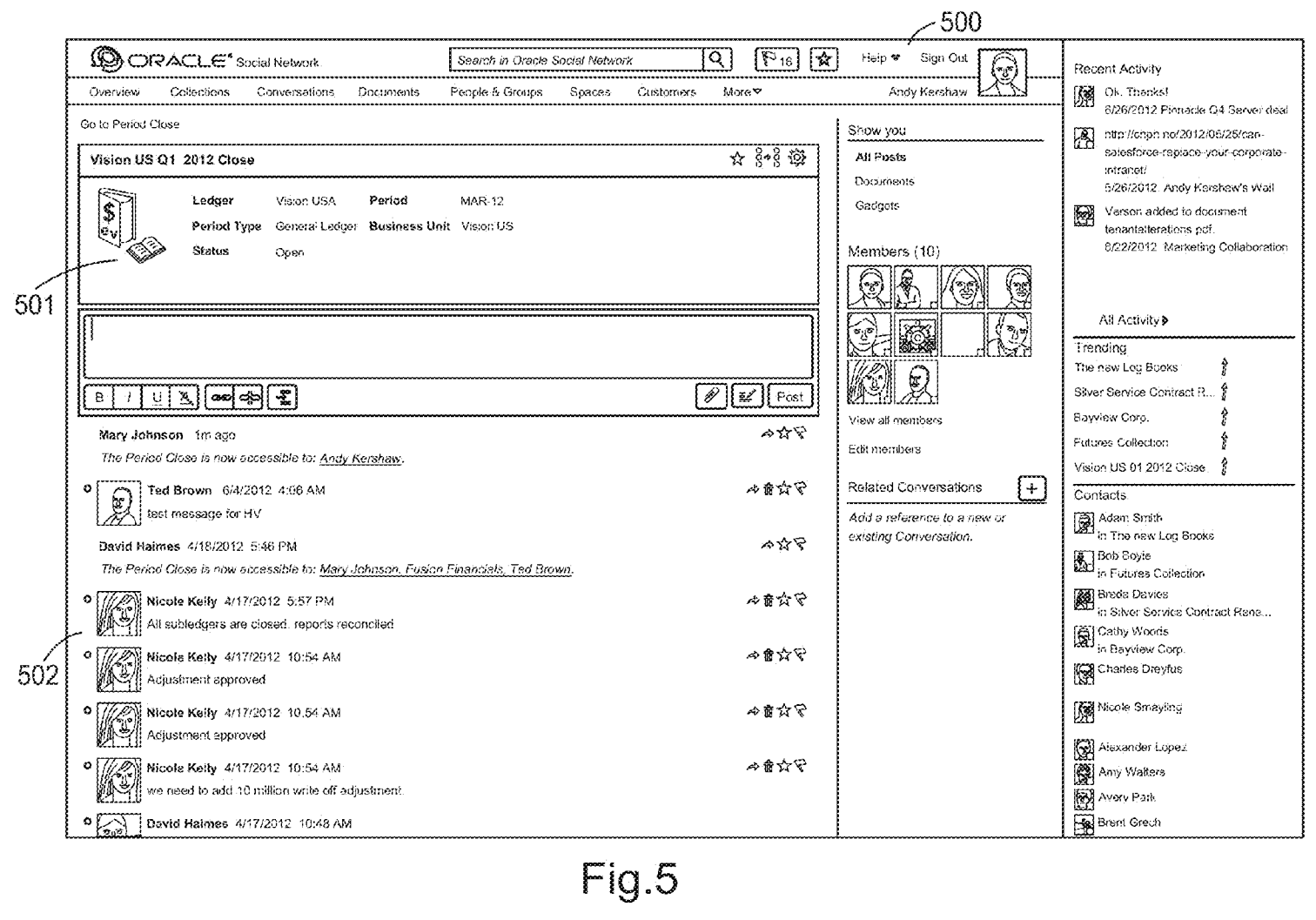

FIG. 5 is a screenshot showing another example social object 500 in accordance with one embodiment of the present invention. Social object 500 shown in FIG. 5 is a General Ledger Period Close social object for the "Vision US Q1 2012" period close. The period closing financial information in one embodiment is generated from a business object and updated from a system-of-record of a financial/ERP system. The information properties for social object 500 are shown at 501, and the wall is shown at 502. Social object 500 further includes the same elements as social object 400 of FIG. 4

Figure 6:
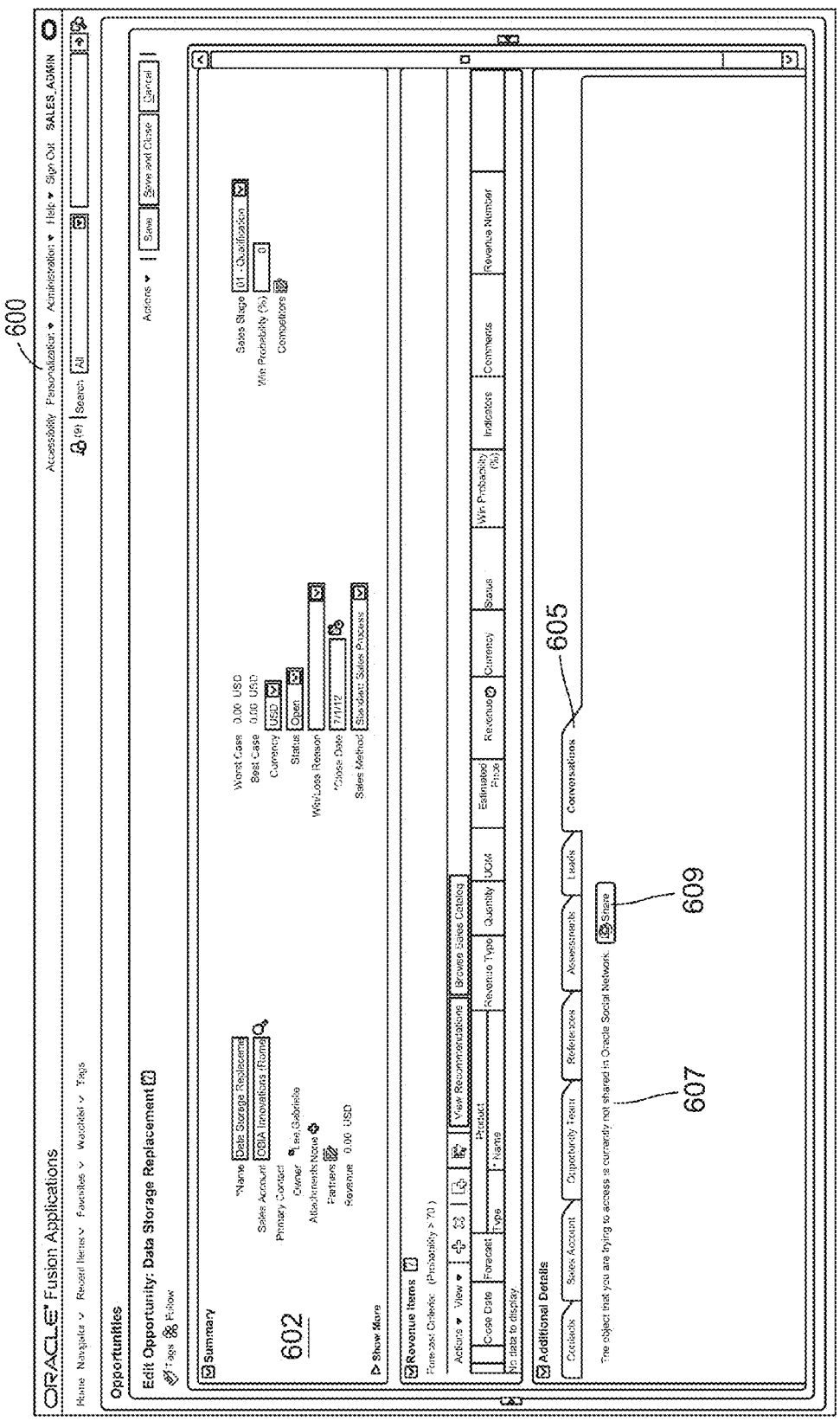
FIG. 6 is a screenshot showing an example business object within an enterprise application in accordance with an embodiment of the present invention.

FIG. 6 is a screenshot showing an example business object 600 within an enterprise application in accordance with an embodiment of the present invention. Business object 600 is an "Opportunity" object named "Data Storage Replacement" within a CRM system. The summary section 602 provides the system-of-record properties for the object. Business object 600 provides links to a corresponding social object in social network 100. Specifically, a tab 605 can be selected to create a conversation related to the corresponding social object. When tab 605 is selected, an API to social network server 10 and social network 100 is used to provide the integration.

In the example of FIG. 6, tab 605 is selected to generate a conversation. However, because the object is not yet shared, a message 607 indicates that the object is not yet shared, and a "Share" button 609 is provided to share the object. Sharing the object causes a social object to be generated that corresponds to business object 600. An API to social network server 10 and social network 100 is used to generate the social object.

Figure 7:
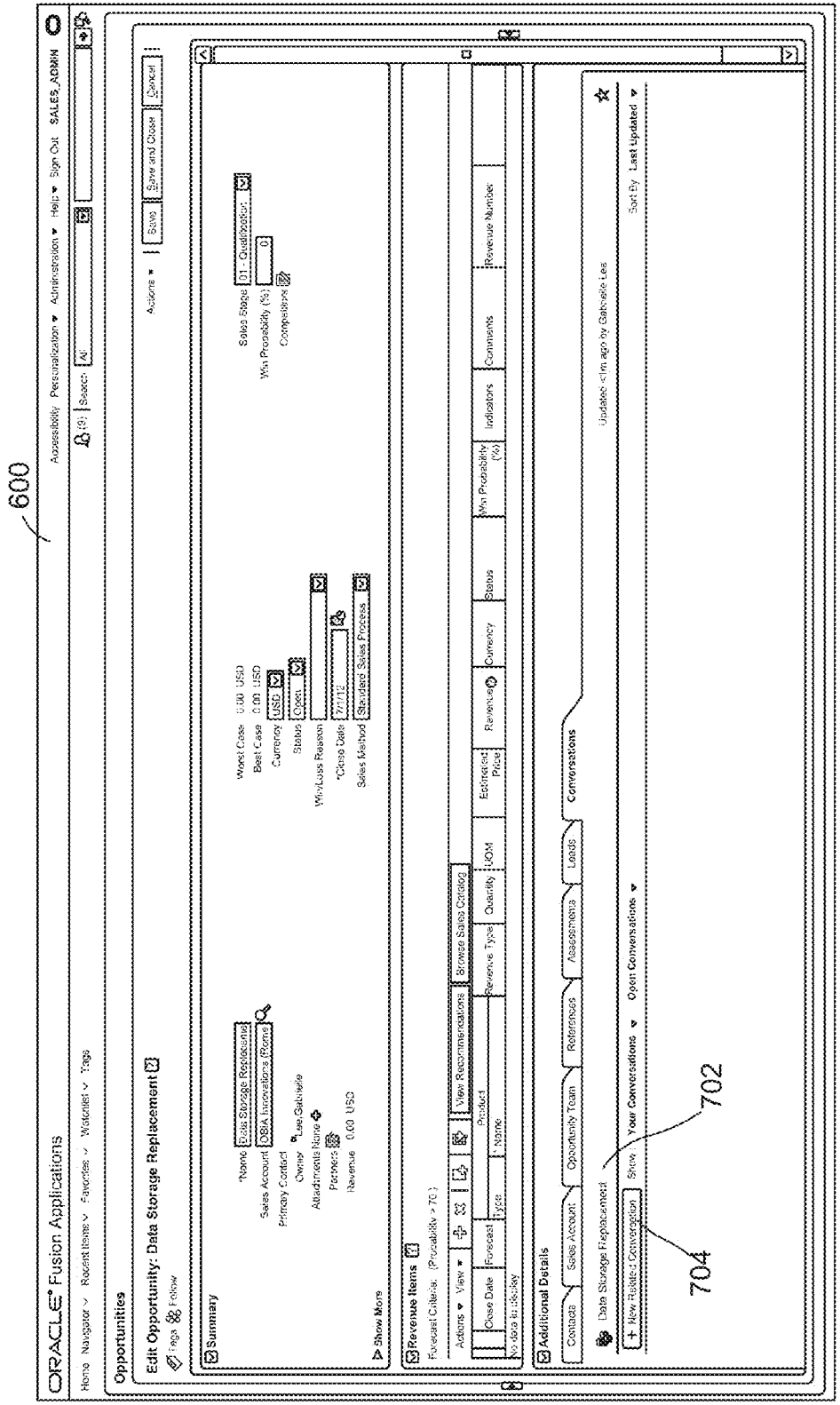
FIG. 7 is a screenshot showing the example business object of FIG. 6 after the share button has been selected in accordance with an embodiment of the present invention.

FIG. 7 is a screenshot showing the example business object 600 of FIG. 6 after Share button 609 has been selected in accordance with an embodiment of the present invention. As shown at 702, a "Data Storage Replacement" social object has been created in social network 100. Business object 600 further includes a "New Related Conversation"

button 704 that can be selected to create a new conversation related to the corresponding "Data Storage Replacement" social object.

Figure 8:
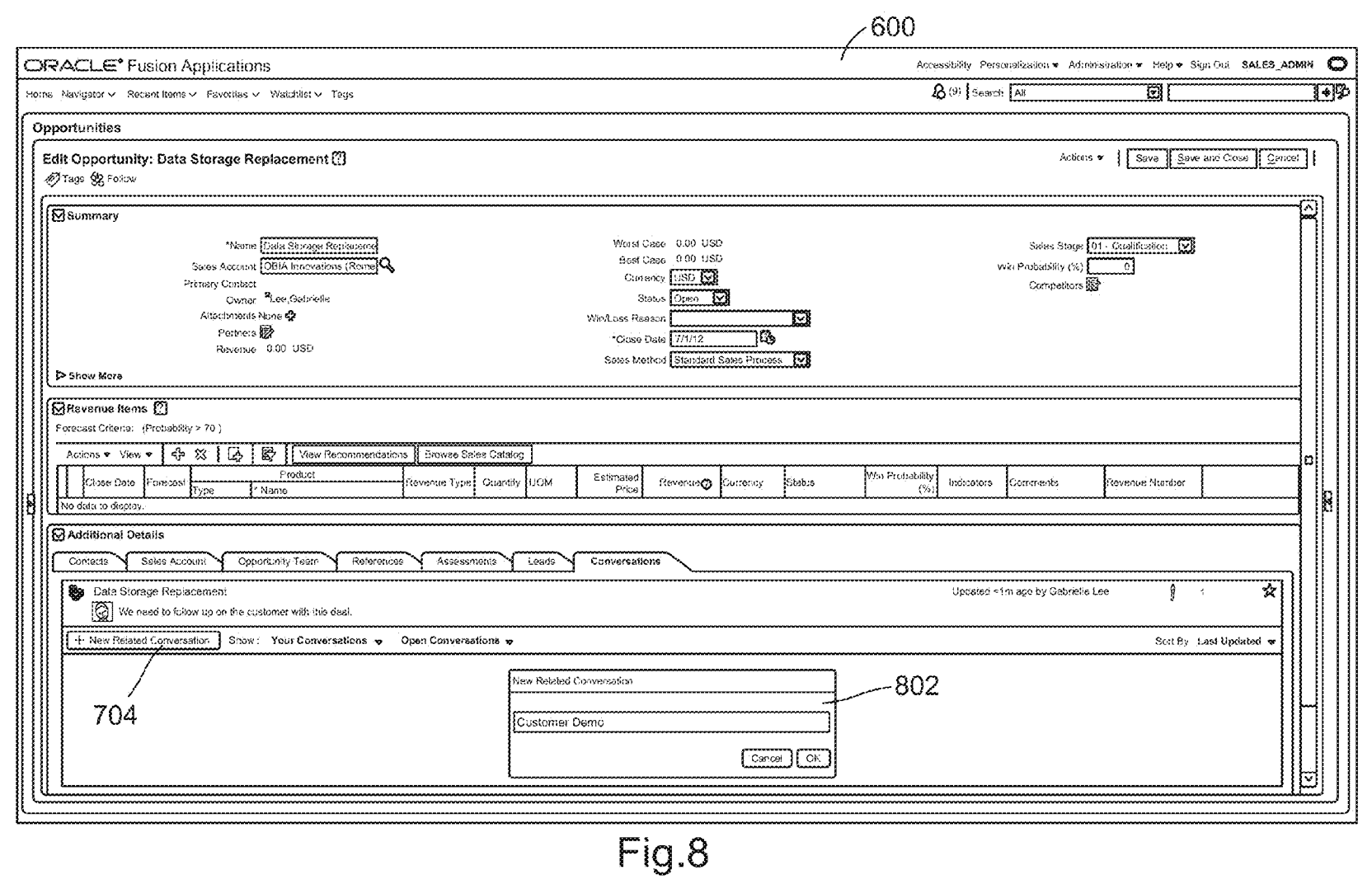

FIG. 8 is a screenshot showing the example business object 600 of FIG. 7 after New Related Conversation button 704 has been selected in accordance with an embodiment of the present invention. A window 802 pops up and the user can enter the name of the new conversation (e.g., "Customer Demo").

Figure 9:
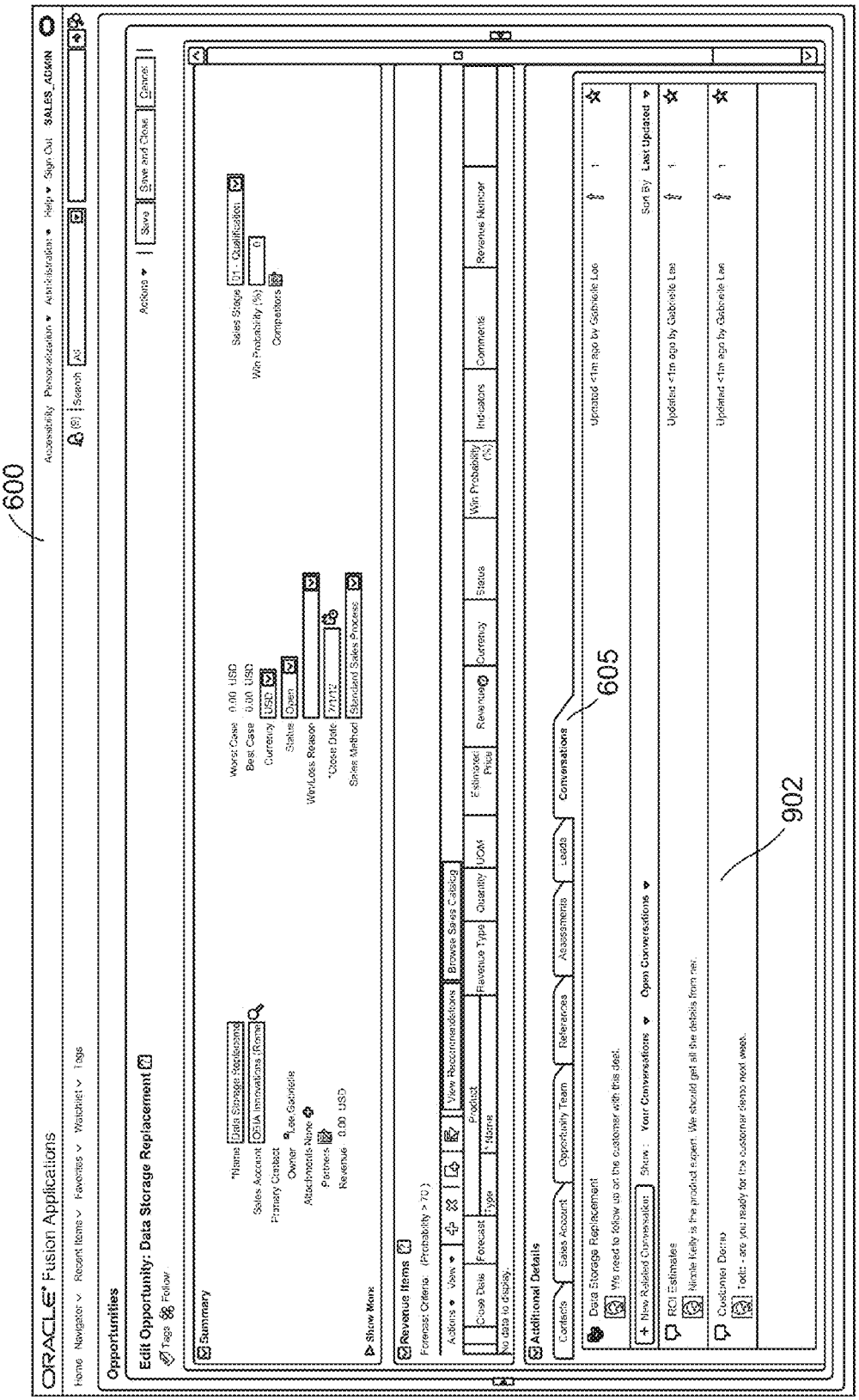
FIG. 9 is a screenshot showing the example business object of FIG. 6 after the conversations tab is selected in accordance with an embodiment of the present invention.

FIG. 9 is a screenshot showing the example business object 600 of FIG. 6 after conversations tab 605 is selected in accordance with an embodiment of the present invention. When tab 605 is selected, now that a social object has been created, all related conversations are displayed at 902. As shown, for the Data Storage Replacement social object, there are two related conversation: "ROI Estimates" and "Customer Demo." In FIG. 9, the related conversations are viewed in-context within the associated system-of-record. However they also may be viewed from within social network 100, as shown in FIG. 3, where the related conversations will be listed for user selection at 315 of FIG. 3.

Figure 10:
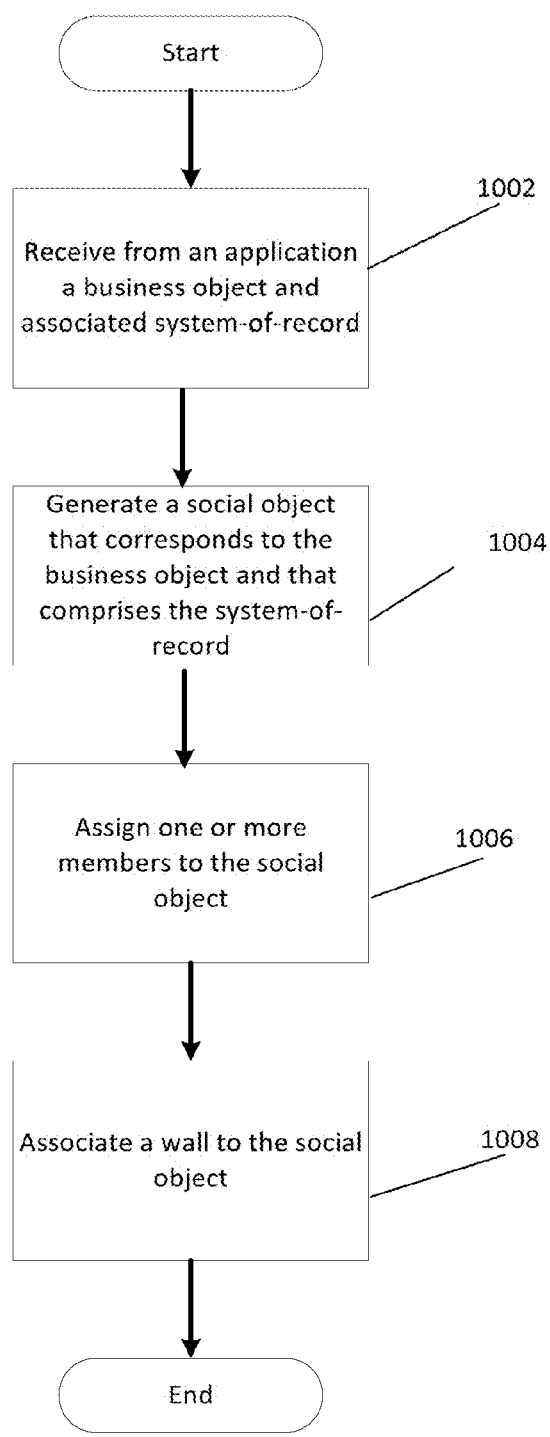
FIG. 10 is a flow diagram of the functionality of the social network module of FIG. 2 when generating a social object from a business object in accordance with one embodiment.

FIG. 10 is a flow diagram of the functionality of social network module 16 of FIG. 2 when generating a social object from a business object and system-of-record in accordance with one embodiment. In one embodiment, the functionality of the flow diagram of FIG. 10, and FIGS. 11 and 14 below, is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 1002, social network module 16 receives from an application a business object and associated system-of-record. In one embodiment, the application is an enterprise application such as a CRM or ERP application. An example of a system-of-record for a business object is shown in section 602 of FIG. 6. An API to social network server 10 and social network 100 of FIG. 1 is used to receive the business object.

At 1004, social network module 16 generates a social object that corresponds to the business object and that comprises the system-of-record. An example of a social object is social object 300 of FIG. 3, in which the system-of-record is shown in section 301.

At 1006, social network module 16 assigns one or more members to the social object. An example of assigned members are members 310 of social object 300 of FIG. 3.

At 1008, social network module 16 associates a wall to the social object. The wall displays changes to the system-of-record. An example of a wall is wall 302 of social object 300 of FIG. 3.

Figure 11:
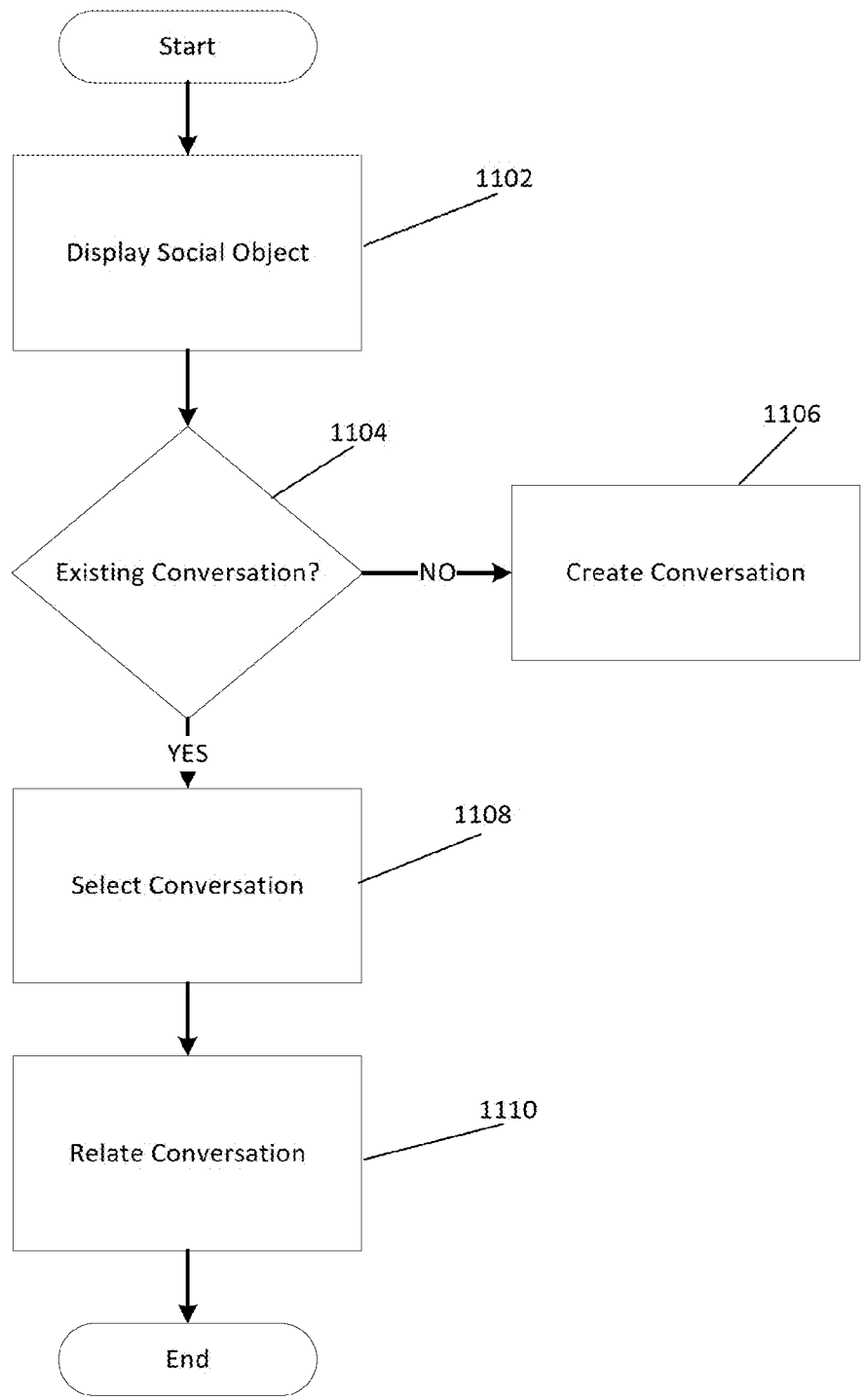
FIG. 11 is a flow diagram of the functionality of the social network module of FIG. 2 when relating a conversation to a social object in accordance with one embodiment.

FIG. 11 is a flow diagram of the functionality of social network module 16 of FIG. 2 when relating a conversation to a social object in accordance with one embodiment.

At 1102, the social object is displayed (assuming it has been created) with the system-of-record. For example, as shown in FIG. 7, social object 702 is displayed within the system-of-record for data storage replacement opportunity.

At 1104, it is determined if there are any existing conversations for the social object. If no at 1104, a conversation is created at 1106. The new conversation at 1106 is automatically related to the social object.

If conversations exist 1104, the conversation is selected at 1108, and the conversation is then related to the social object at 1110.

The functionality of FIG. 11 can be performed within an enterprise application, as shown in FIGS. 6-9, or within social network 100. An API to social network server 10 and social network 100 is used to provide the integration of FIG. 11.

As disclosed, social network 100 allows a social object to be generated and one or more conversations can be related to the social object. The social object is a set of properties tied to a wall. These properties are directly connected to the object in the system-of-record, and are updated either when they are changed in the system-of-record directly, or through actions in social network 100. Changes made within social network 100 are pushed back to the system-of-record to keep the object's properties current at all times. All changes can be logged on the wall, and related conversations can easily be created to discuss specific issues concerning the social object. The social object can be exposed through any type of applications, including the web client, "Outlook" from Microsoft Corp., or other email applications, stand-alone embeddable clients, and all mobile clients.

Social network 100 includes a set of predefined integration mechanisms that enable the user to define how and what data is retrieved from the system-of-record, how to display that data in social network 100 (for example, through social objects) and who within social network 100 has access to the data.

These predefined mechanisms are built to handle the most common application chores, such as specifying membership lists in social network 100 and property sensitivity (i.e., not everyone should be able to see or update all properties without authorization), and updating properties in both directions. For example, when a social object property is updated in the system-of-record, that change is published in social network 100 based on the user permission rules that the user has defined.

Social objects are defined in social network 100 as records within a system-of-record, such as customer or service records from a CRM system. Social object records include metadata and a wall, which includes membership lists and related conversations. Social objects expose system-of-record information to users who interact with and collaborate around the data through a user interface of social network 100.

The social objects provide a uniform and collaborative view of information from all integrated system-of-record. The social objects provide a wide range of services and capabilities in one embodiment, including:

Displaying select metadata needed for collaboration via an extensible gadget, usually visible as part of a wall;

Receiving a data stream of important activities fed by an activity stream or a web service from a system-of-record;

Enabling users to post messages, create follow ups, and easily catch up with activity through persisted and related conversations;

Enabling controlled access and collaboration with others via membership lists and rules;

Linking to other social objects; and

Starting related conversations to the social object.

As an example of the functionality of a social object, after a CRM Opportunity social object retrieves a stream of data input from the social object's wall, the process may unfold as follows:

1. Changes in the Opportunity's status, forecast, and revenue are published to the Opportunity's Wall.
2. The new information is shared with a broader group of individuals, who provide more context to the Opportunity.
3. Users not directly tied to the CRM Opportunity team can now interact and react to the Opportunity's status. For example, if the Opportunity is won, that may be the Service organization's cue to take over and begin the implementation process. The Service organization can then publish that information on the Opportunity's Wall.

Communication also works in the other direction. When the Opportunity is updated from within social network 100, the change is reflected in the system-of-record as well. Before the change is made, social network 100 checks to ensure that the user has the right to update the object, from changing a simple property to changing the state of the object (for example from "Pending" to "Won"). There is no need to go back into CRM to update key fields as social network 100 automatically provides the updates.

As discussed, social network 100 includes multiple areas that accept user input, collectively referred to as "conversations". These areas include an unrelated conversation, a conversation related to a social object, or a conversation related to a personal profile of a user. Each conversation has one or more members. The user input can be in the form of posts or comments, collectively referred to as user "messages". Examples of messages include text or rich text posts, comments, or attached documents, audio files or video files. In one embodiment, each message "belongs" to a single conversation. A message can also be generated by social object updates generated by a system of record. In one embodiment, for each user and each conversation that the user is a member of, social network 100 determines the unread/read status of each message aggregated over the entire social network.

By utilizing the read/unread status, a user can visualize, sort and order activity that has occurred by whether they have seen/read it before. For example, a user can find the conversation with the highest number of messages/posts that they as an individual have not read. Further, the user within the conversation stream can easily distinguish the posts that they have not read from the posts that they have read. Once the posts have been read, the user can either mark all posts as read or just mark individual posts as read.

Figure 12:
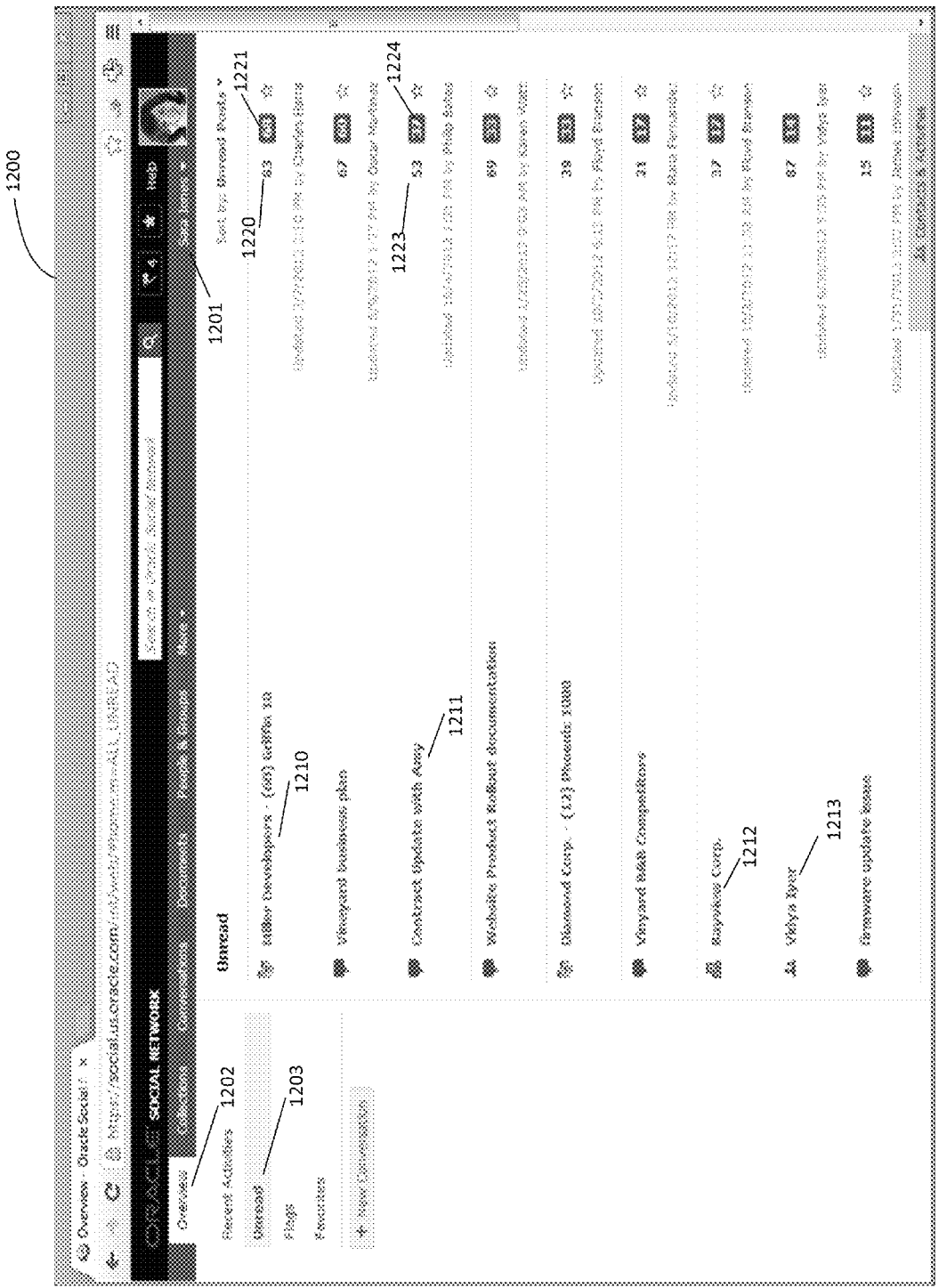
FIG. 12 is a screenshot showing a list of conversations for a user/member of the social network in accordance with an embodiment of the present invention.

FIG. 12 is a screenshot showing a list of conversations 1200 for a user/member of social network 100 in accordance with an embodiment of the present invention. In FIG. 12, the user is "Sara Jones" as indicated at 1201, an "overview" page 1202 is selected, and "unread" messages 1203 is selected within page 1202. A list of conversations that "Sara Jones" is a member of is displayed. The conversations include a social object related conversation 1210 ("Miller Developers"), an unrelated conversation 1211 ("Contract Update with Amy"), a social object related conversation 1212 ("Bayview Corp.") and a personal profile related conversation 1213 (the wall for "Vidya Iyer"). Each listed conversation includes a total message count and an unread message count that is a count of unread messages for the particular user (i.e., "Sara Jones"). For example, for conversation 1210, there are 83 total messages (shown at 1220) and 68 unread messages (shown at 1221). For conversation 1211, there are 53 total messages (shown at 1223) and 37 unread messages (shown at 1224). The conversations are sorted in order of most unread messages to least unread messages. The sorting can also be based on alternative criteria. As shown in FIG. 12, the unread message indicator is available across all conversation types, including social object related conversations.

Figure 13:
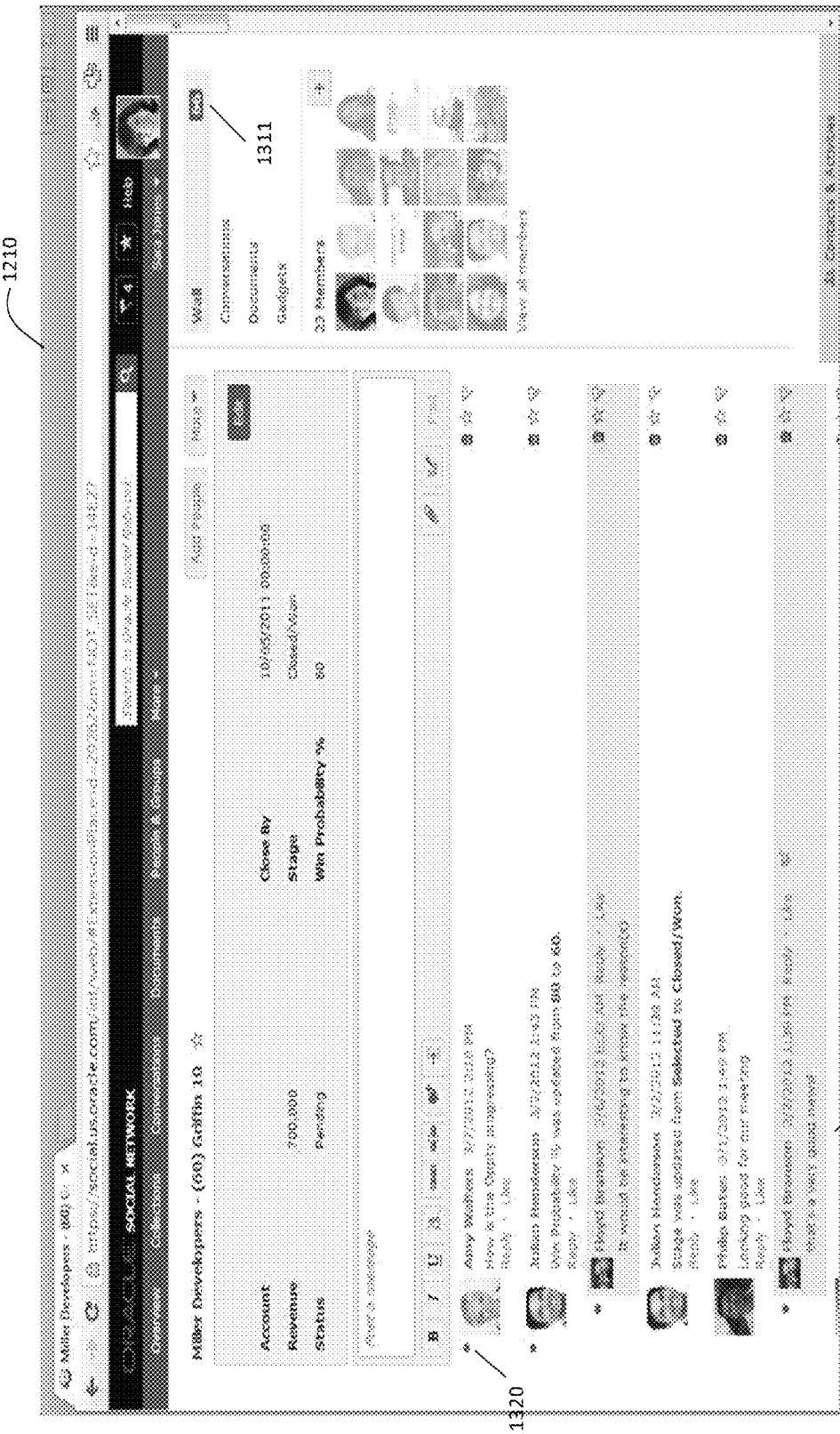
FIG. 13 is a screenshot showing the "Miller Developers" social object from FIG. 12 in accordance with an embodiment of the present invention.

FIG. 13 is a screenshot showing the "Miller Developers" social object 1210 from FIG. 12 in accordance with an embodiment of the present invention. Social object 1210 includes a wall 1310 showing a list of messages, and an unread messages count 1311 for the wall. Each message on the wall includes an indicator 1320 such as a dot that indicates that the message is read or unread. In the example of FIG. 13, the presence of a dot indicates that the corresponding message is unread, and the absence of a dot indicates that the corresponding message is read. A user can click on the indicator/dot to mark it as read, in which case the dot will disappear.

As discussed, social network 100 via social network server 10 of FIG. 1 keeps track of which messages have been read by each user. A message can be marked read explicitly by the user, or the software can automatically mark it read (e.g., if it has been displayed on the screen for a certain amount of time). Maintaining this state information allows social network server 10 to efficiently provide each user with a customized list of social objects and conversations that helps users find new or updated information. In particular, the list of the user's social objects and conversations (i.e., the social objects and conversations the user is a member of) can be ordered by the number of unread messages. Therefore, the user does not waste time reviewing information that has already been seen, and the user is directed to information, such as social object status changes, that is effectively new to the user.

In one embodiment, in order to track unread messages, each conversation maintains a count of the number of messages in that conversation. Each message in a conversation is assigned an ordinal number (1, 2, 3, etc.) in increasing order. For each (Member, Conversation) tuple, a list is maintained of the message ordinals that have been marked read by that member. This is represented by an ordered list of ranges, which offer the possibility for optimization by condensing the list. For example, if a conversation has six messages, with ordinals 1 through 6, and the member has read messages 1, 2, 4, 5, and 6 (but not 3), the list of unread messages in a conversation for a given user can be represented as two lists: the range [1-2] and the range [4-6]. If the member subsequently reads message 3, the ranges [1-2], [3], [4-6] can be condensed into a single range [1-6].

Embodiments further maintain a count of the messages/posts in each conversation that have been read by each member in a database table, allowing queries and sorts to be performed in a database such as database 17 of FIG. 2. In one embodiment, the database table can be expressed as follows:

```
create table XConvMemberInfoObjects
(
    ConversationID    INTEGER NOT NULL,
    UserID            INTEGER NOT NULL,
    MessagesRead      INTEGER NOT NULL
)
```

In this embodiment, "ConversationID" and "UserID" are specified as "integer" for example purposes. In other embodiments, they could be represented as integral values, globally unique identifier ("GUIDs"), or other numeric or string-based identifiers.

Embodiments further maintain a database table of conversation messages/posts, such as the following:

```
create table XConvMessagesObjects
(
    ConversationID     INTEGER NOT NULL,
    MessageOrdinal     INTEGER NOT NULL,
    MessageCount       INTEGER NOT NULL
)
```

When a list of social objects and conversations is generated (e.g., as shown in FIG. 12) embodiments can join these tables and compute the number of unread messages in each conversation, for the current user. A Structured Query Language ("SQL") query can use an "order by" clause to return the conversations and social objects in the desired order, either with the most unread messages first, or the fewest unread messages first. Further, a "where" clause can be specified to limit the results to include only those conversations and social objects that have unread message, or that do not have unread messages.

Figure 14:
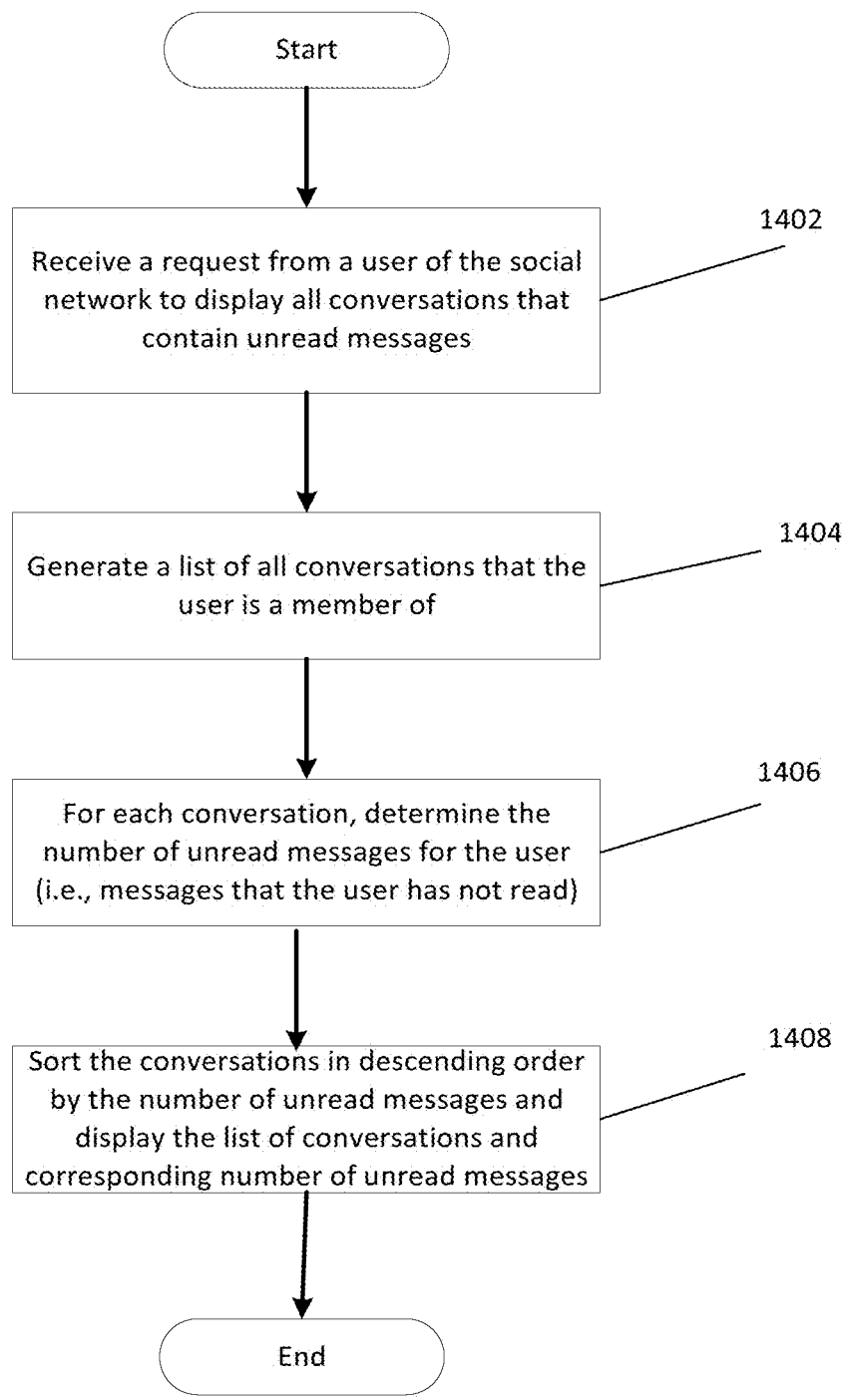
FIG. 14 is a flow diagram of the functionality of the social network module of FIG. 2 when providing tracking and sorting of unread messages across the social network in accordance with one embodiment.

FIG. 14 is a flow diagram of the functionality of social network module 16 of FIG. 2 when providing tracking and sorting of unread messages across the social network in accordance with one embodiment. The order of execution of the steps of the functionality shown in FIG. 14 in general may be varied, and one or more of the functionality may occur substantially at the same time in response to an SQL query.

At 1402, a request from a user of social network 100 to display all conversations that contain unread messages is received. In one embodiment, the request is in the form of a selection of the overview/unread selectors as shown in FIG. 12.

At 1404, a list of all conversations that the user is a member of is generated. The conversations may include an unrelated conversation (i.e., not related to a social object or personal profile), a conversation related to a social object, or a conversation related to a personal profile of the user. Each conversation has one or more members, and one of the members is the user.

At 1406, for each conversation, the number of unread messages for the user (i.e., messages that the user has not read) is determined. If a message has not been read by the particular user, it will be counted as an unread message for the particular user, whether or not it has been read by other members. Examples of messages include text or rich text posts, comments, or attached documents, audio files or video files. A message may be related to multiple social objects or other conversations. A message can also be generated by social object updates generated by a system of record.

At 1408, the conversations are sorted in descending order by the number of unread messages and the list of conversations with the corresponding number of unread messages is displayed. Other sorting criteria options can also be used.

As disclosed, for a user of the social network that is a member of one or more conversations, embodiments display for each conversation the number of unread messages for the user, and can sort the conversations by the number of unread/read messages. Therefore, the user can fairly easily determine which messages to read and/or which conversation to focus on for conversations for that user across the entire social network.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to track unread messages pertaining to a social object created to share a business object across a social network for a social network user, the tracking comprising:

receiving a request from the user to display unread messages across the social network related to the business object, wherein the social network is an online service for building social relations or networks;

generating and displaying a list of one or more conversations related to the business object, wherein the user is a member of the displayed conversations; and for each conversation, determining and displaying a number of unread messages from among the one or more conversations related to the business object;

wherein the conversations include content which assists with collaboration required to change the business object.

2. The computer readable medium of claim 1, further comprising:

sorting the conversations based on the number of unread messages.

3. The computer readable medium of claim 1, wherein at least one of the conversations is related to the social object, the social object including records that are mapped as a visual and programmatic integration into the social network, wherein the records are from a system of record associated with a business application.

4. The computer readable medium of claim 3, the tracking further comprising generating the social object by:

receiving from an application the business object and the system of record that is associated with the business object;

generating the social object that corresponds to the business object and that comprises the system of record;

assigning one or more members to the social object; and associating a wall to the social object, wherein the wall is a stream of posts that displays changes to the system of record and status posts from users of the social network who have appropriate access rights.

5. The computer readable medium of claim 1, wherein at least one of the conversations is related to a personal profile of the user which is a representation of the user in the social network.

6. The computer readable medium of claim 1, wherein a message is unread if it was not indicated as read by the user.

7. The computer readable medium of claim 1, wherein the determining the number of unread messages comprises:

for each message in the conversation, assigning an ordinal number;

creating a (Member, Conversation) tuple; and for each tuple, maintaining a list of message ordinals that have been marked read by the member, wherein the list is represented by an ordered list of ranges.

8. A computer-implemented method for tracking unread messages pertaining to a social object created to share a business object across a social network for a social network user, the method comprising:

receiving a request from the user to display unread messages across the social network related to the business object, wherein the social network is an online service for building social relations or networks;

generating and displaying a list of one or more conversations related to the business object, wherein the user is a member of the displayed conversations; and for each conversation, determining and displaying a number of unread messages from among the one or more conversations related to the business object;

wherein the conversations include content which assists with collaboration required to change the business object.

9. The method of claim 8, further comprising:

sorting the conversations based on the number of unread messages.

10. The method of claim 8, wherein at least one of the conversations is related to the social object, the social object including records that are mapped as a visual and programmatic integration into the social network, wherein the records are from a system of record associated with a business application.

11. The method of claim 10, further comprising generating the social object by:

receiving from an application the business object and the system of record that is associated with the business object;

generating the social object that corresponds to the business object and that comprises the system of record;

assigning one or more members to the social object; and associating a wall to the social object, wherein the wall is a stream of posts that displays changes to the system of record and status posts from users of the social network who have appropriate access rights.

12. The method of claim 8, wherein at least one of the conversations is related to a personal profile of the user which is a representation of the user in the social network.

13. The method of claim 8, wherein a message is unread if it was not indicated as read by the user.

14. The method of claim 8, wherein the determining the number of unread messages comprises:

for each message in the conversation, assigning an ordinal number;

creating a (Member, Conversation) tuple; and for each tuple, maintaining a list of message ordinals that have been marked read by the member, wherein the list is represented by an ordered list of ranges.

15. A social network server comprising:

a message generator that generates messages pertaining to a social object created to share a business object on for a social network user of a social network in response to input from the user, wherein the social network is an online service for building social relations or networks, wherein each message belongs to a conversation related to the business object;

a conversation list generator that generates and displays a list of one or more conversations related to the business object for the user, wherein the user is a member of the displayed conversations; and an unread message generator that, for each displayed conversation, determines and displays a number of messages that are unread by the user and that belong to the conversation from among the one or more conversations related to the business object;

wherein the conversations include content which assists with collaboration required to change the business object.

16. The social network server of claim 15, wherein the conversation list generator sorts the conversations based on the number of unread messages.

17. The social network server of claim 15, wherein at least one of the conversations is related to the social object, the social object including records that are mapped as a visual and programmatic integration into the social network, wherein the records are from a system of record associated with a business application.

18. The social network server of claim 17, further comprising a social object generator that:

receives from an application the business object and the system of record that is associated with the business object;

generates the social object that corresponds to the business object and that comprises the system of record;

assigns one or more members to the social object; and associates a wall to the social object, wherein the wall is a stream of posts that displays changes to the system of record and status posts from users of the social network who have appropriate access rights.

19. The social network server of claim 15, wherein at least one of the conversations is related to a personal profile of the user which is a representation of the user in the social network.

20. The social network server of claim 15, wherein a message is unread if it was not indicated as read by the user.

21. The social network server of claim 15, wherein the unread message generator determines the number of messages that are unread by the user by:

for each message in the conversation, assigning an ordinal number;

creating a (Member, Conversation) tuple; and for each tuple, maintaining a list of message ordinals that have been marked read by the member, wherein the list is represented by an ordered list of ranges.

* * * * *